United States Patent
Fischer et al.

(10) Patent No.: US 8,154,146 B2
(45) Date of Patent: Apr. 10, 2012

(54) GENERATOR, NACELLE, AND MOUNTING METHOD OF A NACELLE OF A WIND ENERGY CONVERTER

(75) Inventors: Martin Fischer, Klagenfurt (AT); Anton Wolf, Viktring (AT); Michael Schwarz, Klagenfurt (AT)

(73) Assignee: AMSC Windtec GmbH, Klagenfurt Am Worthersee (AT)

( * ) Notice: Subject to any disclaimer, the term of this patent is extended or adjusted under 35 U.S.C. 154(b) by 0 days.

(21) Appl. No.: 12/682,818

(22) PCT Filed: Sep. 14, 2009

(86) PCT No.: PCT/EP2009/061879
§ 371 (c)(1),
(2), (4) Date: Apr. 13, 2010

(87) PCT Pub. No.: WO2010/081568
PCT Pub. Date: Jul. 22, 2010

(65) Prior Publication Data
US 2011/0148119 A1    Jun. 23, 2011

Related U.S. Application Data

(60) Provisional application No. 61/144,713, filed on Jan. 14, 2009.

(51) Int. Cl.
*F03D 11/00* (2006.01)
*H02K 9/00* (2006.01)
(52) U.S. Cl. ............... 290/55; 290/44; 310/266; 310/52
(58) Field of Classification Search .............. 290/43, 290/44, 54, 55; 310/266, 52
See application file for complete search history.

(56) References Cited

U.S. PATENT DOCUMENTS

| | | | | |
|---|---|---|---|---|
| 6,285,090 | B1 * | 9/2001 | Brutsaert et al. | 290/55 |
| 7,119,453 | B2 * | 10/2006 | Bywaters et al. | 290/55 |
| 7,154,191 | B2 * | 12/2006 | Jansen et al. | 290/55 |
| 7,154,192 | B2 * | 12/2006 | Jansen et al. | 290/55 |
| 7,154,193 | B2 * | 12/2006 | Jansen et al. | 290/55 |
| 7,183,665 | B2 * | 2/2007 | Bywaters et al. | 290/55 |
| 7,372,174 | B2 * | 5/2008 | Jones et al. | 290/44 |
| 7,385,305 | B2 * | 6/2008 | Casazza et al. | 290/55 |
| 7,548,008 | B2 * | 6/2009 | Jansen et al. | 310/266 |
| 7,891,941 | B2 * | 2/2011 | Bevington et al. | 415/123 |
| 7,944,077 | B2 * | 5/2011 | Fischer et al. | 290/55 |
| 2003/0034701 | A1 * | 2/2003 | Weeber et al. | 310/52 |
| 2004/0041409 | A1 | 3/2004 | Gabbys | |

(Continued)

FOREIGN PATENT DOCUMENTS

| | | |
|---|---|---|
| DE | 10255745 | 6/2004 |
| EP | 1925820 | 5/2008 |

*Primary Examiner* — Nicholas Ponomarenko
(74) *Attorney, Agent, or Firm* — Occhiuti Rohlicek & Tsao LLP

(57) ABSTRACT

An apparatus for wind energy conversion includes a nacelle having a main frame, the main frame having a lower part and an upper part joined to the lower part, the upper part having a first strap extending across the lower part; a stator disposed within the nacelle; a rotor disposed within the nacelle; a mounting surface attached to the main frame and defining a rotor space, the mounting surface having a first side-face that exposes the rotor space; and a flange rotatably supported on the main frame and including a first end connected to the rotor. The rotor is cantilevered from the flange into the rotor space from the first side face.

25 Claims, 10 Drawing Sheets

U.S. PATENT DOCUMENTS

| | | |
|---|---|---|
| 2006/0152014 A1 | 7/2006 | Grant et al. |
| 2009/0134628 A1* | 5/2009 | Stiesdal .......................... 290/55 |
| 2009/0134630 A1* | 5/2009 | Stiesdal .......................... 290/55 |
| 2009/0224550 A1* | 9/2009 | Bray et al. ...................... 290/55 |
| 2010/0127503 A1* | 5/2010 | Fischer et al. .................. 290/55 |
| 2010/0133854 A1* | 6/2010 | Jansen et al. .................. 290/1 C |

* cited by examiner

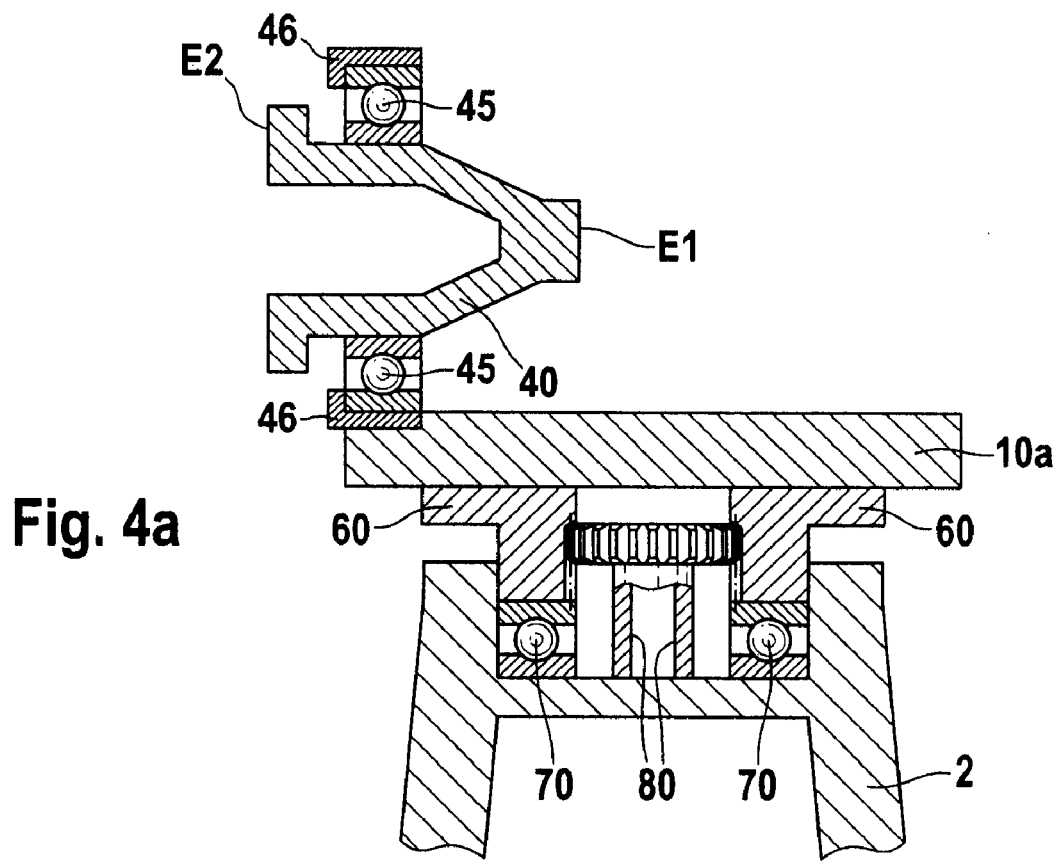

GENERATOR, NACELLE, AND MOUNTING METHOD OF A NACELLE OF A WIND ENERGY CONVERTER

CROSS-REFERENCE TO RELATED APPLICATIONS

This application is the National Stage of International Application No. PCT/EP2009/061879, filed on Sep. 14, 2009, which claims the priority of U.S. Application No. 61/144,713, filed Jan. 14, 2009. The contents of both applications are hereby incorporated by reference in their entirety.

FIELD OF DISCLOSURE

The present disclosure relates generally to wind energy converters, and in particular, to a generator, a nacelle, and to mounting a nacelle of a wind energy converter.

BACKGROUND

A wind energy converter is a rotating machine that converts the kinetic energy in wind into electricity and feeds the electricity into the electrical grid.

A wind energy converter generally includes a nacelle disposed on a tower. The nacelle (also called a "gondola") includes a rotor head equipped with blades, and a main shaft connected to the rotor head, also called hub, that integrally rotates with the rotor head. Moreover, the nacelle can rotate around a vertical axis so as to actively or passively follow the wind direction.

A first type of nacelle further includes a gear box connected to the main shaft, which rotates upon receiving the wind power supplied to the blades, and a generator driven by an output shaft from the gear box. According to the wind energy converter having this structure, the rotor head equipped with the blades converts wind power into a torque, and the main shaft rotates to generate a first rotational speed. The first rotational speed is increased via the gear box connected to the main shaft, and a corresponding second larger rotational speed is transmitted to the rotor of the generator.

A second type of nacelle, which lacks a gear box, uses direct drive turbines with AC generators having a variable frequency. Special high power electronics convert this variable frequency to constant frequency for transmission on the grid.

In present wind energy converters, the nacelle must ultimately be on top of a tower. This often requires lifting the nacelle, or its constituent parts, using a crane. Such a task is quite difficult and complex because the components are massive.

SUMMARY

In one aspect, the invention features an apparatus for wind energy conversion. The apparatus includes a nacelle having a main frame having a lower part and an upper part joined to the lower part. The upper part has a first strap that extends across the lower part. A stator and a rotor are both disposed within the nacelle. A mounting surface is attached to the main frame and defines a rotor space. The mounting surface has a first side-face that exposes the rotor space. A flange is rotatably supported on the main frame and includes a first end connected to the rotor. The rotor is cantilevered from the flange into the rotor space from the first side face.

In some embodiments, the stator, the rotor, or both can include a superconductor.

Other embodiments include those in which the first strap is configured to apply a radially inward force to the mounting surface, those in which the first strap is fastened to the mounting surface, and those in which the first strap conforms to an outer surface of the mounting surface.

Embodiments of the nacelle also include those in which the mounting surface includes an integrated mounting plate configured to receive a fastener for fastening the first strap to the mounting surface. In some of these embodiments, the mounting plate includes a T-beam ring integral with the mounting surface.

In additional embodiments, the nacelle includes a friction interface between the mounting surface and parts of the main frame. For example there can be a friction interface between the mounting surface and the first strap. In some of these embodiments, the friction compound is disposed between the integrated mounting plate and the first strap. Or there may be a friction interface between the mounting surface and the lower part of the main frame.

Specific friction compounds can be found in some embodiments. For example, different embodiments of the nacelle include those in which the friction compound includes zinc.

Additional embodiments include those in which the frictional force between the friction interface and the mounting surface are increased, for example by providing a series of bolts for coupling the housing to the first strap, to the lower part of the main frame, or both.

Additional embodiments include those in which the upper part of the main frame has two or more straps extending across the lower part of the main frame. In such embodiments, a friction interface can be provided between the mounting surface and any combination of straps, and/or the lower part of the main frame. Bolts can also be provided to exert a force that increases the frictional force between the friction interface and any part of the main frame.

In some embodiments, an outer surface of the stator defines the mounting surface. But in other embodiments, there is a generator housing within which the stator and rotor are disposed. In such cases, the mounting surface is defined by the outer surface of the generator housing.

In another aspect, the invention features a method for assembling a wind energy converter. Such a method includes mounting a first part of a nacelle main frame on a tower, and mounting a rotatably supported flange, which includes a first end, on the first part of the main frame. A mounting surface that at least partially encloses the rotor space is then provided. The mounting surface has a first and second side face, in which first side face of the mounting surface exposes the rotor space. Spacers are provided in the rotor space. A rotor is inserted into the rotor space such that the spacers are positioned between the rotor and the stator. The mounting surface, including the inserted rotor, is mounted on the first part of the main frame. The first end of the flange is connected to the rotor. The spacers are then removed such that the rotor is cantilevered into the rotor space from the first side face. A first strap is connected to the first part of the main frame, the first strap extending across the first part of the main frame and conforming to the mounting surface.

Additional practices of the invention include securing the first strap to the mounting surface. Securing the first strap can include fastening the first strap to a mounting plate integrated into the mounting surface, providing a friction interface between the mounting surface and the first strap, and/or fastening the first strap to a T-beam ring integrated into the mounting surface.

In another aspect, the invention features a generator having a mounting surface at least partially enclosing a rotor space a mounting plate extending along at least a portion of the mounting surface; and a cantilevered rotor extending into the rotor space. The has a first and second side face. The first side face of the mounting surface exposes the rotor space.

Embodiments of the generator include those in which the mounting plate includes a ring extending around the mounting surface.

Additional embodiments include those in which the mounting surface is an outer surface of a generator housing, and those in which the mounting surface is an outer surface of a stator.

Yet other embodiments include those in which a friction interface is disposed on the mounting surface.

In a general aspect, a nacelle of a wind energy converter includes a main frame, a generator including a stator and a rotor, and a generator housing attached to the main frame and at least partially enclosing the stator and a rotor space. The generator housing has a first side face that exposes the rotor space. A flange is rotatably supported on the main frame and includes a first end connected to the rotor. The rotor extends into the rotor space from the first side face without being supported in the generator housing.

In another aspect, a nacelle of a wind energy converter includes a main frame, a generator including a stator and a rotor, a generator housing attached to the main frame and at least partially enclosing the stator and a rotor space, and a flange rotatably supported on the main frame and including a first end connected to the rotor. The rotor extends into the rotor space without being supported in the generator housing.

Embodiments may include one or more of the following. The flange includes a second end connected to a hub for attaching rotor blades. The generator housing is of substantially cylindrical shape, e.g., of cylindrical cup shape. The generator housing includes a first side face, the first side face exposing the rotor space. The generator housing includes a second side face opposite to the first side face, the second side face including at least one opening.

The main frame is form-closed with an outer surface of the generator housing. The main frame includes a first part and a second part that are releasably connected with each other and that embrace, or conform to, the generator housing. An air gap between the stator and the rotor is at least 1 cm, e.g., between 1 cm and 5 cm. At least one of the stator and the rotor includes a superconductor.

In a further aspect, a mounting method of a nacelle of a wind energy converter includes the steps of mounting a first part of a main frame on a tower, mounting a rotatably supported flange that includes a first end on the first part of the main frame, providing a generator housing at least partially enclosing a stator and a rotor space, providing spacers in the rotor space, inserting a rotor into the rotor space such that the spacers are positioned between the rotor and the stator, mounting the generator housing including the inserted rotor on the first part of the main frame, connecting the first end of the flange to the rotor, and removing the spacers such that the rotor extends into the rotor space without being supported in the generator housing.

Embodiments may include one or more of the following. A second part of the main frame is mounted such that the first and second parts embrace the generator housing. The flange includes a second end. The method further includes the step of connecting the second end to a hub for attaching rotor blades. The step of mounting the flange includes mounting a bearing supported by a bearing housing on the first part of the main frame.

In another aspect, a generator includes a stator, a rotor, and a generator housing at least partially enclosing the stator and a rotor space. The rotor extends into the rotor space without being supported in the generator housing.

Embodiments may include one or more of the following. The generator housing is of substantially cylindrical shape, e.g., of cylindrical cup shape. The generator housing includes a first side face, the first side face exposing the rotor space. The generator housing includes a second side face opposite to the first side face, the second side face including at least one opening.

An air gap between the stator and the rotor is at least 1 cm, e.g., between 1 cm and 5 cm. At least one of the stator and the rotor includes a superconductor. A cooling system is provided in the generator housing. A sensor is provided in the generator housing.

With the generator described herein, it is possible to integrate a generator housing in a main frame that contains several components, e.g. generator and stator of the generator, but that does not support the rotor. By integrating this special generator housing in the main frame, the transport and mounting problems of the generator can be drastically reduced.

The generator housing can furthermore include rigidity improvement parts. Depending on the housing rigidity, the mainframe rigidity can be supported or compensated. Generally, the rigidity of the housing is determined by the main-frame. Moreover, improved testability components can be included. The generator housing facilitates the whole generator testing process as there is only a need for a single separate mounted bearing and rotor.

The cylindrical housing can be fully or partially closed/open on the rear side. With this construction, a device can be mounted that allows easy integration of the housing into the mainframe and also easy extraction of the housing from the mainframe.

It is preferred that the housing be a cylindrical housing. If the cylindrical form is chosen for the housing, only torsion forces are transferred into the cylindrical housing.

With an open rear side construction, the generator can be very easily assembled from or disassembled into constituent parts. This feature eases the task of maintaining the integrated components in the housing.

Integrated temperature measuring systems linked to a cooling and heating circuit can be provided to monitor the temperature and, depending on the monitored temperature, to start or stop the integrated cooling or heating circuits.

A generator and a nacelle as described herein provide significant advantages. The generator housing offers protection to integrated sensitive components during transport and mounting. Fixing the generator housing into an already mounted tower and a partially mounted or completely mounted nacelle is much easier than lifting and mounting a completely pre-assembled nacelle.

All these above-mentioned advantages will help to reduce the overall cost in wind turbine manufacturing by easing the tasks of transport and assembling, by providing integrated cooling and/or heating, and by improving rigidity. The simplified testing conditions also contribute significantly to cost reduction.

Further aspects are illustrated in the accompanying drawings and described in detail in the following part of the description.

BRIEF DESCRIPTION OF THE FIGURES

FIGS. 1a,b are cross-sectional views showing an example of the internal structure of one embodiment of a nacelle, with FIG. 1a being a longitudinal cross-section along the blade rotational axis A, and FIG. 1b being a transverse cross-section of the generator along the nacelle rotational axis B indicated as A-A' in FIG. 1a;

FIGS. 3a-c show another example of a mounting surface that may be used in the nacelle of FIG. 1a, in which FIG. 3a is a plain side view of the side S1, FIG. 3b is a vertical cross-section along the blade rotational axis A, and FIG. 3c is a plain side view of the side S2;

Throughout the figures the same reference numbers indicate the same or functionally equivalent parts. It should be noted that the individual figures for explaining specific modes of operation do not include all details, but just the details needed for explaining the respective mode.

DETAILED DESCRIPTION

Figure 5:
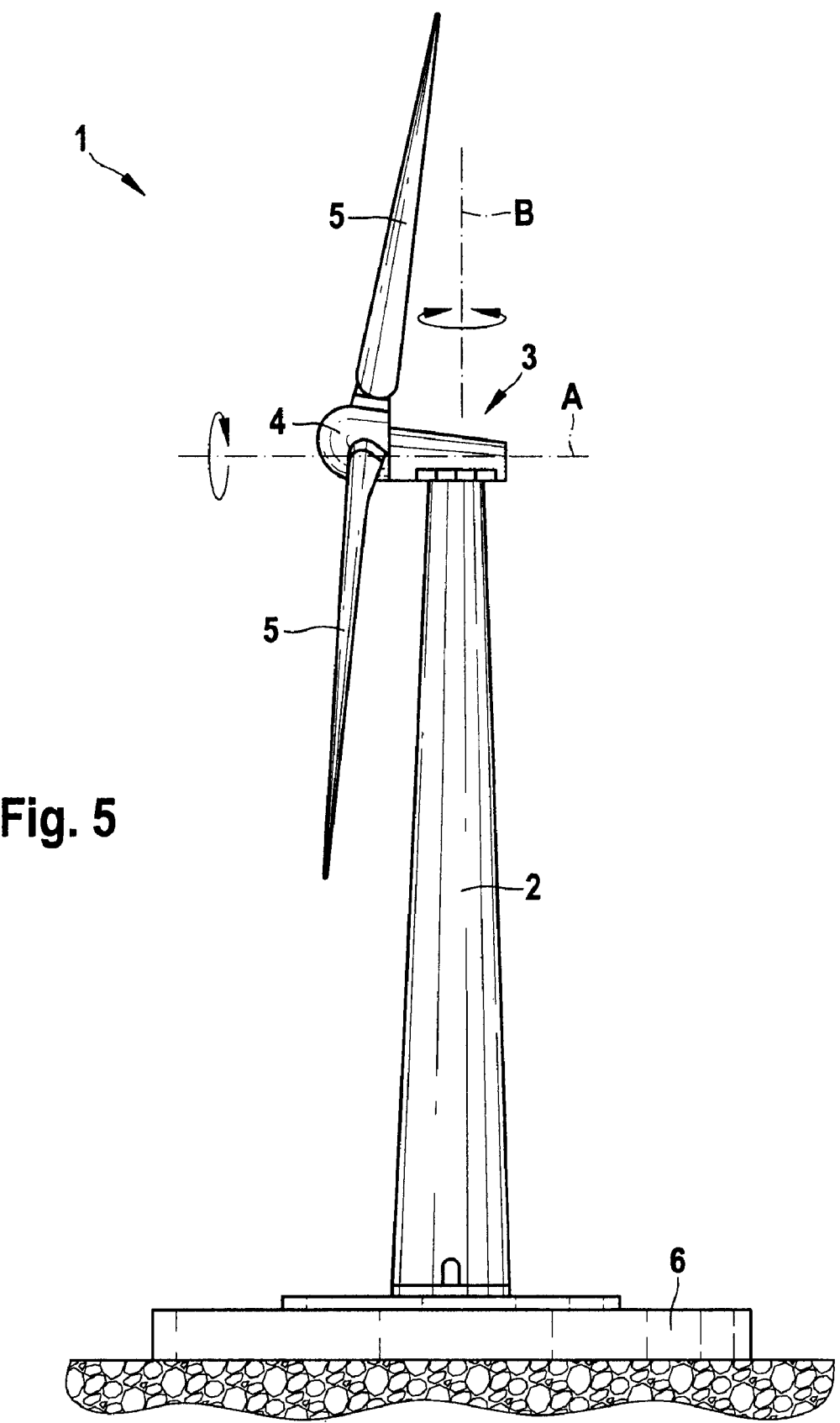
FIG. 5 is a side view showing an example of the overall structure of a wind energy converter.

FIG. 5 is a side view showing an example of the overall structure of a wind energy converter. A wind energy converter 1 includes a tower 2 disposed on a foundation 6, a nacelle 3 provided on the upper end of the tower 2, the nacelle being rotatable around a substantially vertical axis B, and a rotor head 4 provided on the nacelle 3 including a hub (not shown) for fixing rotor blades 5, with the rotor head 4 being rotatable around a substantially horizontal axis A.

Blades 5 extending radially from the rotation axis A are attached to the rotor head 4 at different circumferential angles. Wind power supplied to the blades 5 from the direction of the variable rotation axis A of the rotor head 4 rotates the rotor head 4 around the rotation axis.

Figure 1A:
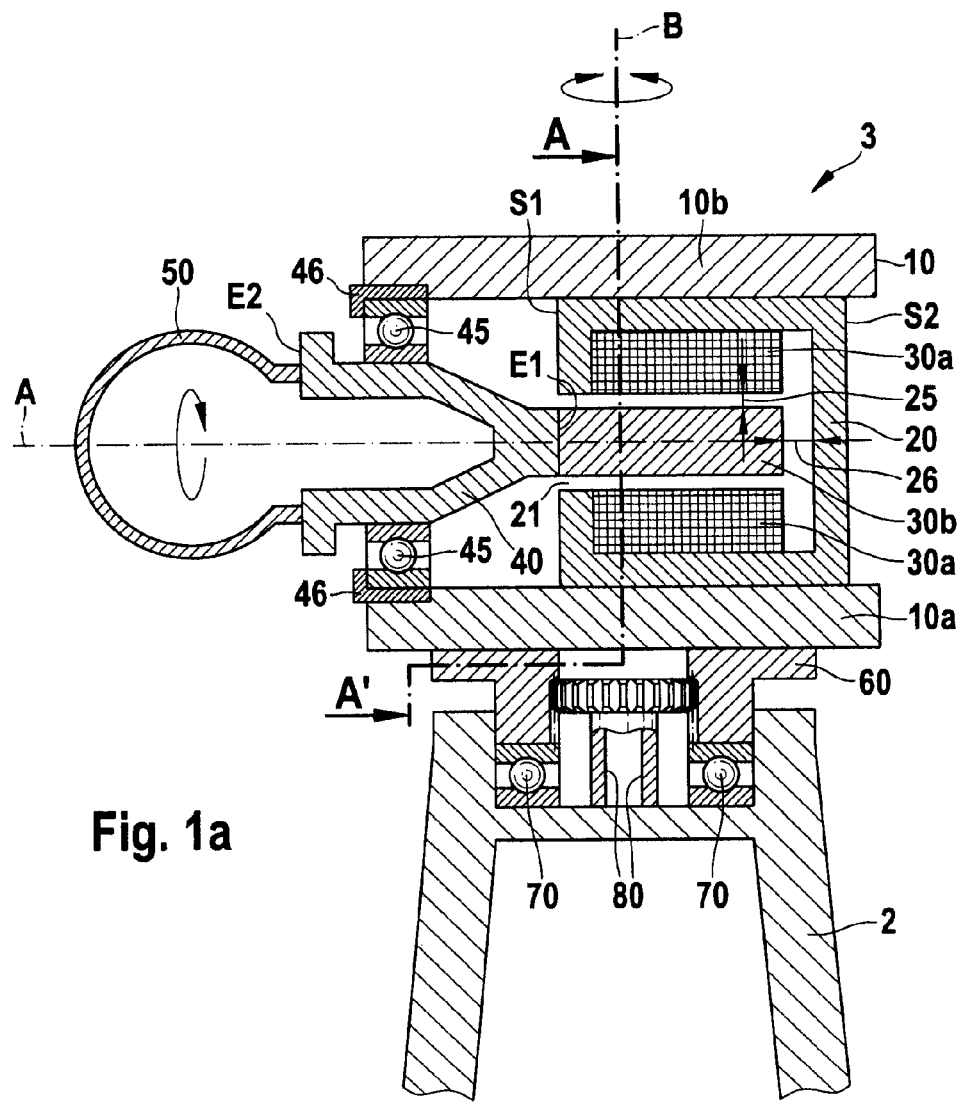
Figure 1B:
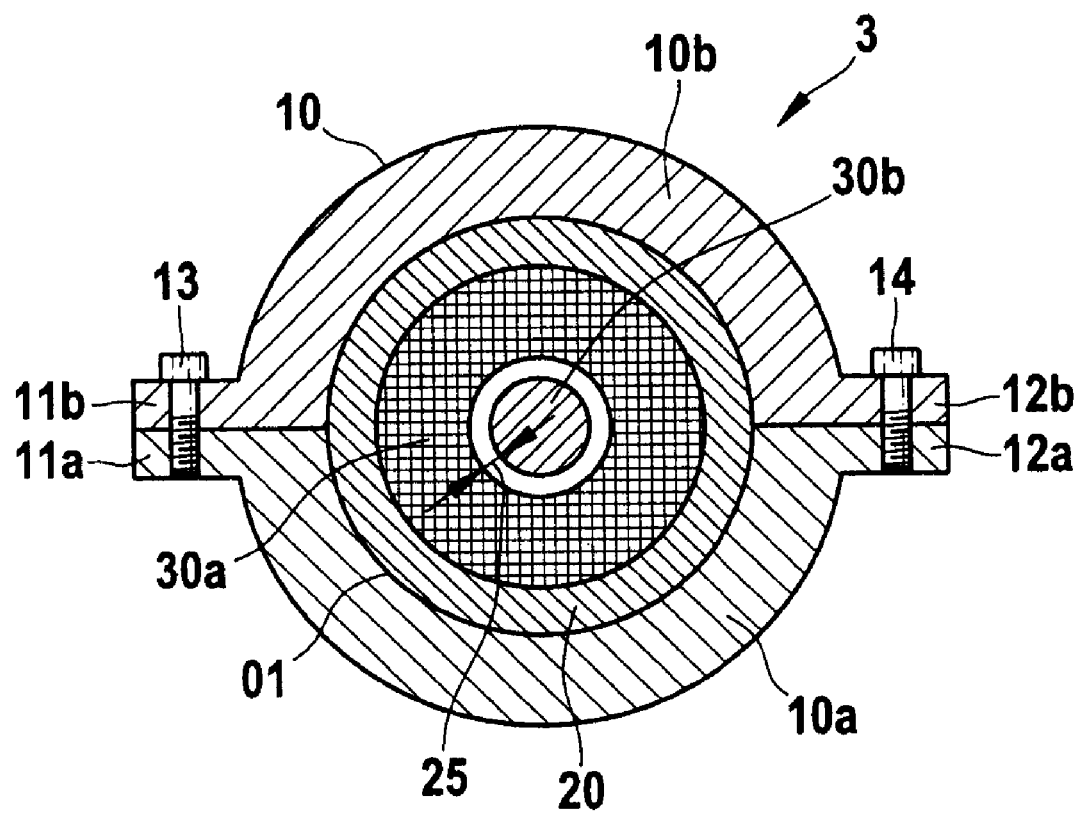

FIGS. 1a and 1b are cross-sectional views showing an example of the internal structure of a nacelle, with FIG. 1a being a longitudinal cross-section along the blade rotational axis A, and FIG. 1b being a transverse cross-section along the nacelle rotational axis B indicated as A-A' in FIG. 1a.

The nacelle 3 includes a mainframe 10 having a lower part 10a and an upper part 10b that together enclose a cylindrical space (see FIG. 1b) defined by the cylindrical inner surface O1 of the lower and upper parts 10a, 10b.

The upper part 10b is fixed to the lower part 10a by bolts 13, 14 mounted in flanges 11a, 12a integrally provided in the lower part 10a and flanges 11b, 12b integrally provided in the upper part 10b.

The lower part 10a and the upper part 10b surround, or conform to a mounting surface 20, which can be either the outer surface of a cylindrical generator housing or the surface of a stator 30a. In those embodiments in which the mounting surface 20 is the outer surface of a generator housing, the stator 30a and a rotor space 21 for accommodating a rotor 30b are within the generator housing. The generator housing is a pre-assembled part that can be separately mounted between the lower and upper parts 10a, 10b of the mainframe 10, separately from the rotor 30b.

In either case, at least one of the stator 30a and rotor 30b includes a superconductor.

The mounting surface 20 has a first side face S1 and a second side face S2. In this example, the second side face S2 is fully closed such that the mounting surface 20 forms a cylindrical cup.

The first side face S1 is open and exposes the rotor space 21. A cylindrical bearing 45 supported by a bearing housing 46 is mounted between the lower and upper parts 10a, 10b of the mainframe 10 to rotatably support a flange 40 having a first and second end E1, E2 and which exhibits a Y-shaped cross-section along axis A.

The first end E1 of the flange 40 is connected to the rotor 30b, which is inserted into the rotor space 21 through the first side face S1 of the mounting surface 20 in a way that avoids contacting any neighboring structures. In other words, the rotor 30b extends into the rotor space 21 from the first side face S1 without further support. The rotor 30b is therefore a cantilevered rotor that is only supported by the flange 40, which is inserted into the bearing 45. Thus, in contrast to known structures, the structure disclosed herein uses only a single bearing 45. This reduces the construction complexity and the costs.

An air gap 25 between the rotor 30b and the stator 30a in this example amounts to about 2.5 cm because the stator coils in this example are superconducting coils that are cooled via pipes (not shown). Another air gap 26 exists between the distal end of the rotor 30b extending from the flange 40 and the second side face S2 of the mounting surface 20. This additional gap 26 typically amounts to several centimeters.

Depending on the mechanical tolerances of the bearing 45 and the other generator components, the air gap 25 may be made smaller than 2.5 cm. However, for air gaps 25 below 1 cm it is difficult to realize such an arrangement with a single bearing 45. As a result, for such air gaps, it is preferable to provide a further bearing outside the mounting surface 20. An additional bearing may also become useful because of deformations resulting from loads acting on the rotor head 4, such as wind loads and weight loads.

Furthermore, attached to the second end E2 of the flange 40 is a hub 50 for attaching rotor blades (not shown). The rotor, together with the flange 40 and the attached hub 50, is rotatable around a horizontal axis A while driven by the wind acting on the rotor blades.

A further flange 60 is attached to the lower part 10a of the mainframe 10. The flange 60 is supported by a bearing 70 provided on the top of the tower 2. The bearing 70 enables the nacelle 3 to rotate about a vertical axis B, which in turn enables it to actively follow wind direction. The nacelle 3 actively follows wind direction using gear drives 80 that act on the inner periphery of the flange 60 in a conventional manner. The lower part 10a of the mainframe 10 and flange 60 can be integrated together to form a single part.

Figure 2A:
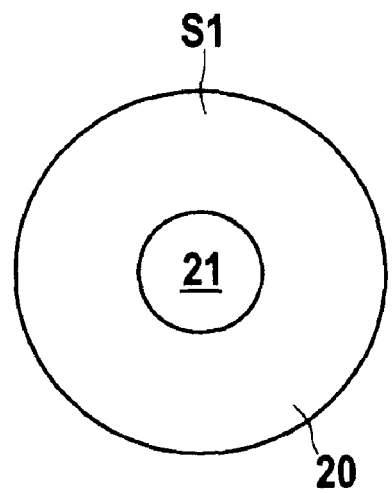
FIGS. 2a-c show a mounting surface from FIG. 1a, with FIG. 2a being a vertical cross-section along the blade rotational axis A, FIG. 2b being a plain side view of the side S1, and FIG. 2c being a plain side view of the side S2.
Figure 2B:
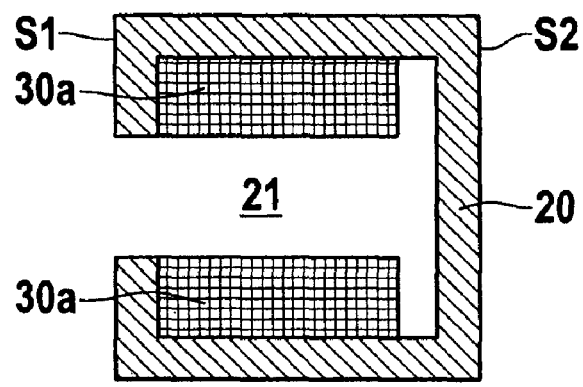
Figure 2C:
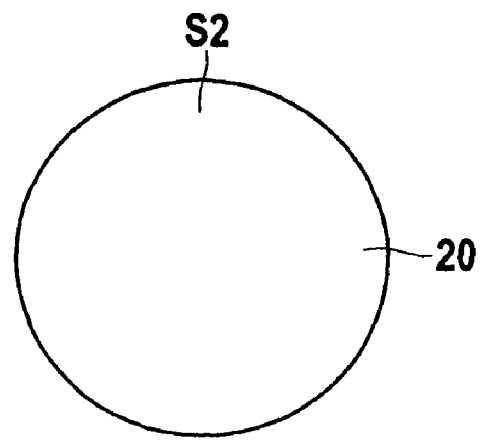

FIGS. 2a-c are different views showing an embodiment in which the mounting surface 20 is the surface of a cylindrical generator housing of FIG. 1a. FIG. 2a is a vertical cross-section along the blade rotational axis A, FIG. 2b is a plain side view of the side S1, and FIG. 2c is a plain side view of the side S2.

As is apparent from FIGS. 2a-c, the mounting surface 20 is closed on its second side face S2 and open on its first side face S1 so that the rotor 30b can be easily inserted into the rotor space 21 from the open side face S1 after the mounting surface 20 has been mounted on the lower part 10a of the mainframe 10.

Figure 3A:
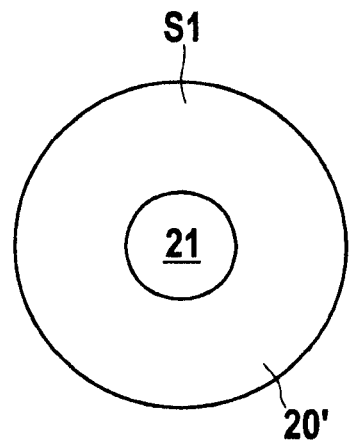
Figure 3B:
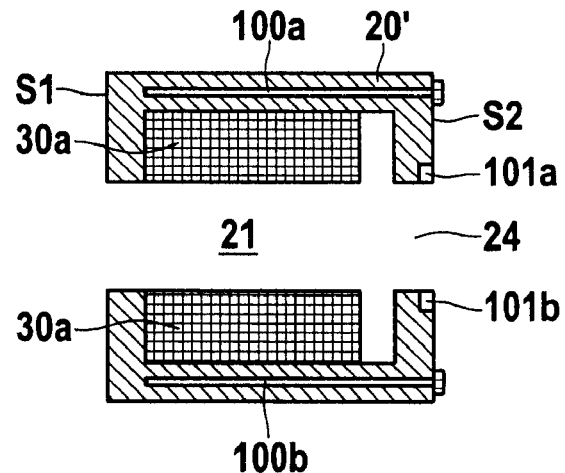
Figure 3C:
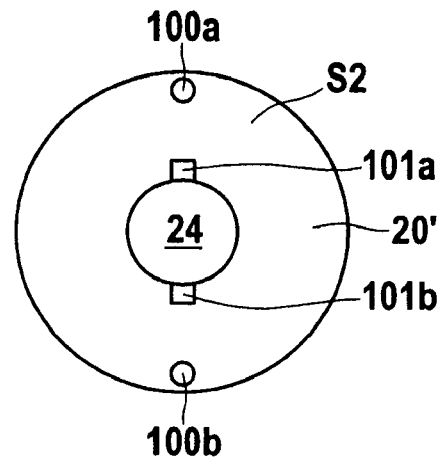

FIGS. 3a-c are different views showing another example of a mounting surface that may be used in the nacelle FIG. 1a. FIG. 3a is a plain side view of the side S1, FIG. 3b is a vertical cross-section along the blade rotational axis A, and FIG. 3c is a plain side view of the side S2.

In the example shown in FIGS. 3a-c, further components are integrated into the mounting surface 20'. Among the components are cooling and/or heating elements 100a, 100b and integrated sensors 101a, 101b for sensing the temperature in the vicinity of the stator 30a and/or rotor 30b. Both the sensors 101a, 101b and heating/cooling elements 100a, 100b have corresponding connection openings in the second side face S2.

A maintenance opening 24 in the side face S2 of the cylindrical mounting surface 20' provides access to the generator components. With an open rear side construction, the generator can easily be assembled from or disassembled into parts. This construction eases the task of maintaining integrated components in the housing.

FIGS. 4a,b are cross-sectional views for illustrating a mounting method of the nacelle of FIG. 1a,b.

With regard to FIG. 4a, in a first step the first bearing 70 is mounted on top of the tower 2.

Then, flange 60 is connected to the lower part 10a of the mainframe 10. Thereafter, the bearing 45 supported by the bearing housing 46 and the flange 40 are mounted on the lower part 10a of the mainframe 10. The preassembled parts 10a, 60, 45, 46, and 40 are lifted together and mounted on top of the tower 2.

In a following step, the gear drives 80 for rotary motion of the nacelle 3 around the vertical axis B are installed in known manner. This leads to the configuration shown in FIG. 4a.

Figure 4B:
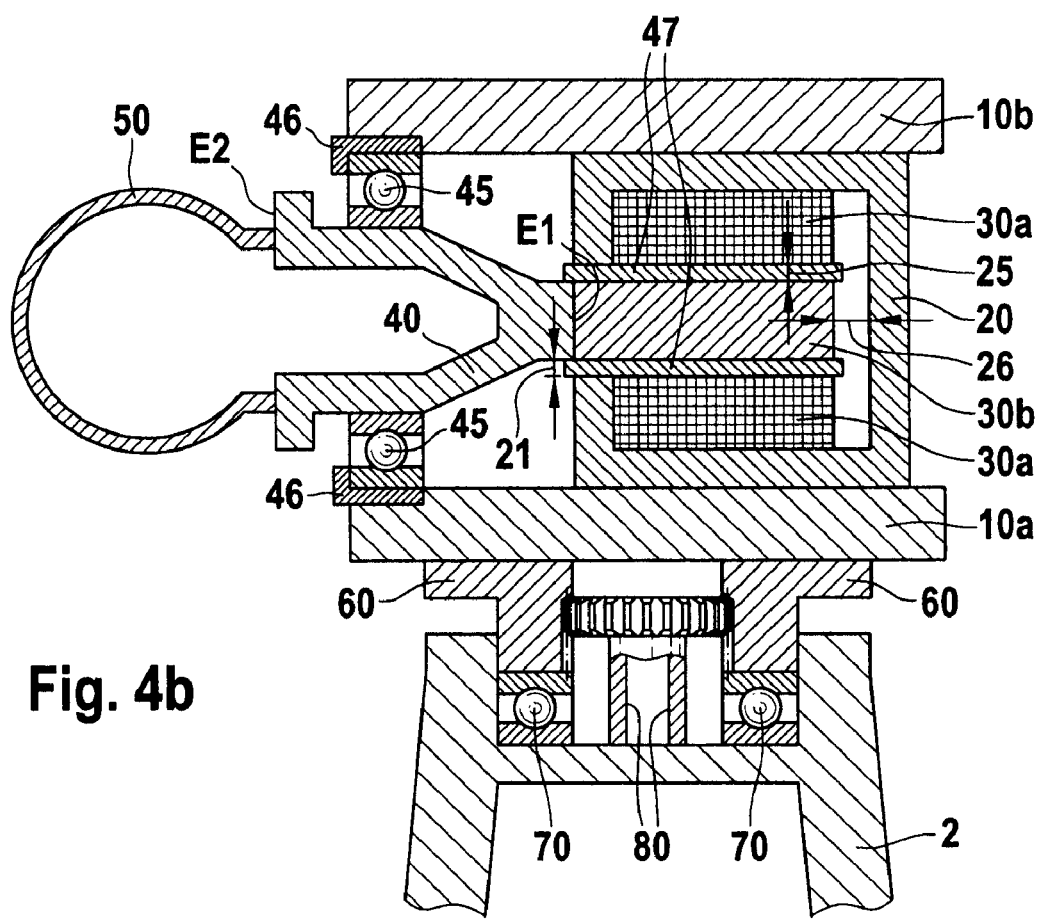
FIGS. 4a,b are cross-sectional views for illustrating a mounting method of the nacelle of FIGS. 1a and 1b.

In a next step, as illustrated in FIG. 4b, the rotor 30b is inserted into the rotor space 21 such that the rotor 30b extends into the rotor space 21 from the first side face S1 without contacting the stator 30a. During assembly, air gap spacers 47 separate the rotor 30b and stator 30a, and a gap 26 separates the mounting surface 20 from the rotor 30b. The air gap spacers 47 in the air gap 25 (e.g. bumpers) thus serve to protect the stator 30a during the mounting process.

Then, the mounting surface 20, including the inserted rotor 30b, is lifted onto the lower part 10a of the mainframe 10. In this example, the mounting surface 20 conforms to the cylindrical surface O1 of the lower part 10a of the mainframe, such that self-alignment can be achieved.

Thereafter, the flange 40 is connected to the rotor 30b at its first end E1 using a fastener, such as a nut or a bolt.

Finally, the air gap spacers 47 are removed and the upper part 10b of the mainframe 10 is mounted on top of the lower part 10a so as to surround the bearing 45 and the mounting surface 20 and to establish a fully form-closed arrangement. The fixing of the lower and upper parts 10a, 10b of the mainframe 10 is then achieved by fixing bolts 13, 14, shown in FIG. 1b. The hub 50 is then connected to the end E2 of the flange 40 by fasteners, such as nuts or bolts. This results in the structure shown in FIG. 1a.

Further steps such as attaching the rotor blades and cable and piping connections will not be explained here since they are well known in the art.

Figure 6:
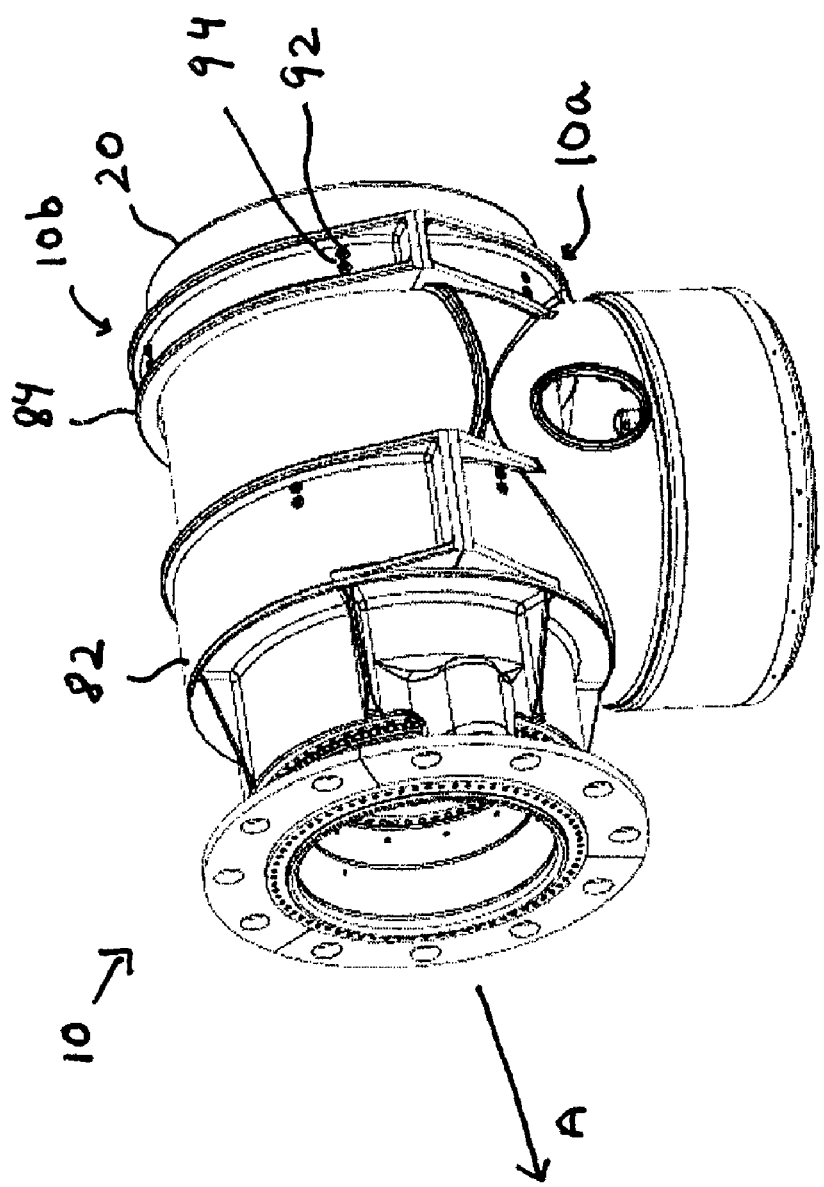
FIG. 6 is an isometric view of an alternative nacelle.
Figure 7:
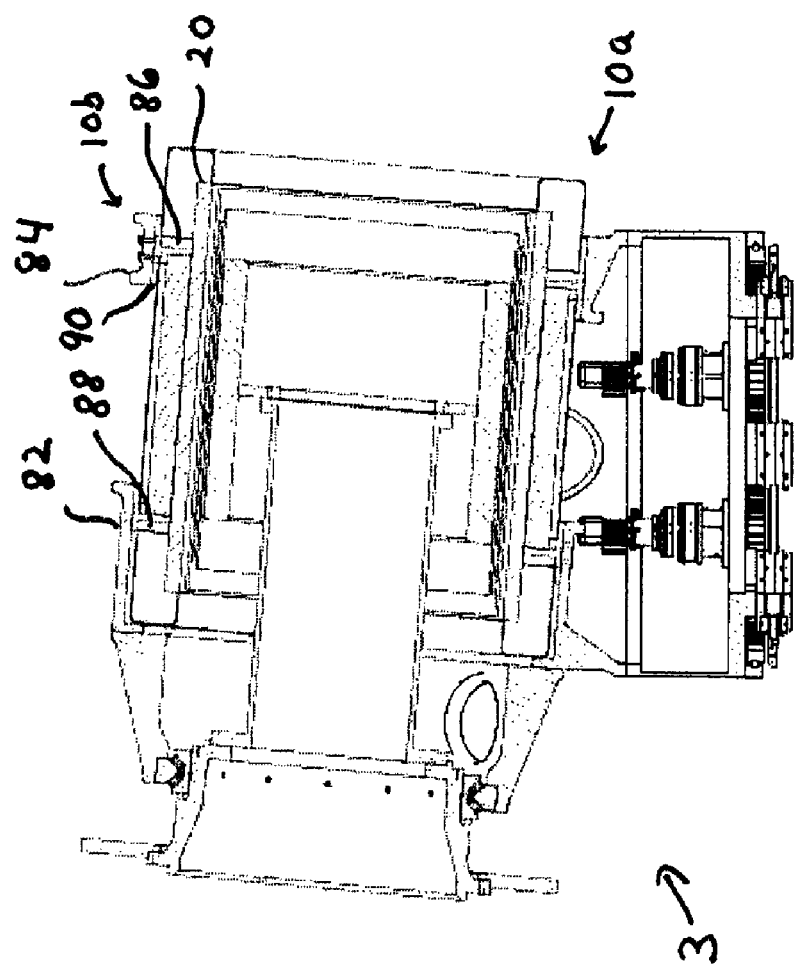
FIG. 7 is a transverse view of the alternative nacelle of FIG. 6.

In another embodiment, the upper part 10b of the mainframe 10 includes front and rear straps 82, 84 that extend along an arc in a direction perpendicular to the horizontal axis A of the nacelle 3, as shown in isometric view in FIG. 6 and in transverse cross-section in FIG. 7. Both the front and rear straps 82, 84 are screwed into, or otherwise attached to the lower part 10a of the mainframe 10.

The front and rear straps 82, 84 wrap around the mounting surface 20, as shown in FIG. 6. In so doing, they apply a compressive, or radially inward force to the mounting surface 20, thus holding it securely in position.

Figure 8:
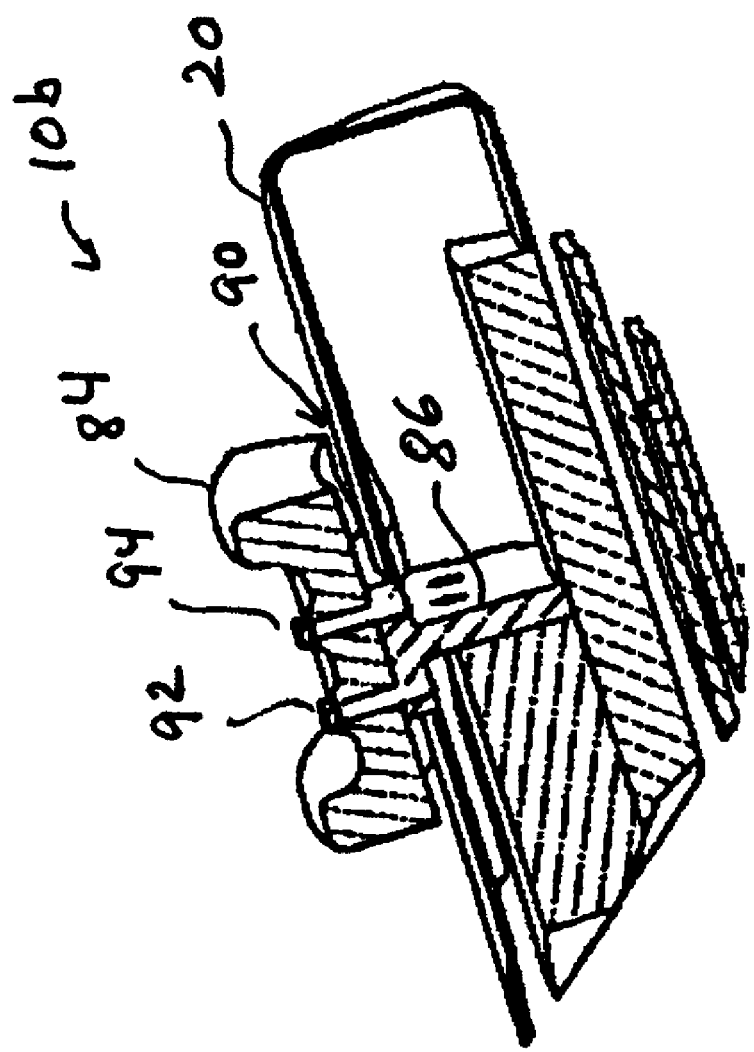
FIG. 8 is a close-up of a portion of the alternative nacelle of FIG. 6.

The mounting surface 20 includes front and rear mounting plates extending along at least a portion thereof. In one embodiment, the mounting plates are integrated T-beam rings 86, 88, best seen in FIG. 7. To more securely engage the straps 82, 84, it is useful to pass bolts 92, 94 or screws through the straps 82, 84 to engage the T-rings 86, 88, as shown in FIG. 8. In addition, it is useful to provide a friction interface 90 between the straps 82, 84 and their corresponding T-rings 86, 88, as shown in FIG. 8.

A friction interface 90 can be provided by applying a friction compound between the straps 82, 84 and their corresponding T-rings 86, 88. A suitable friction compound for this purpose is a silicate primer. One example of such a primer is a zinc-rich ethyl silicate primer. One example of a zinc-rich primer includes 85% zinc by dry weight. A suitable primer is sold under the name "INTERZINC 22" by International Protective Coatings.

A friction interface 90 can also be provided between the lower part 10a and the mounting surface 20. The force exerted by the frictional interface 90 can be enhanced further by providing bolts are other fasteners for squeezing together the surface 20 and the lower part 10a and/or the surface 20 and the straps 82, 84. For example, in the case in which a T-rings 86, 88 extend all the way around the surface 20, the friction interface 90 can be provided all along the T-rings 86, 88. In such cases, one can also provide bolts or similar fasteners periodically or aperiodically all along the T-rings 86, 88.

As a result of replacing the solid upper part 10b of the mainframe 10 with two compressive straps 82, 84, the overall weight of the upper 10b is significantly reduced, thus easing the task of raising the upper part 10b and assembling the nacelle 3.

Although the present invention has been described with reference to embodiments, it is not limited thereto, but can be modified in various manners which are obvious for a person skilled in the art. Thus, it is intended that the present invention is only limited by the scope of the claims attached herewith.

In particular, the present invention is not limited to the cylindrical geometry shown in the embodiments, but applicable for any geometry.

Having described the invention, and a preferred embodiment thereof, what is claimed as new, and secured by Letters Patent is:

1. An apparatus for wind energy conversion, said apparatus comprising:
  a nacelle having a main frame, the main frame having a lower part and an upper part joined to the lower part, the upper part having a first strap extending across the lower part;
  a stator disposed within the nacelle;
  a rotor disposed within the nacelle;
  a mounting surface attached to the main frame and defining a rotor space, the mounting surface having a first sideface that exposes the rotor space; and
  a flange rotatably supported on the main frame and including a first end connected to the rotor;
whereby the rotor is cantilevered from the flange into the rotor space from the first side face.

2. The apparatus of claim 1, wherein the first strap is configured to apply a radially inward force to the mounting surface.

3. The apparatus of claim 1, wherein the first strap is fastened to the mounting surface.

4. The apparatus of claim 1, wherein the mounting surface comprises an integrated mounting plate configured to receive a fastener for fastening the first strap to the mounting surface.

5. The apparatus of claim 1, further comprising a friction interface between the mounting surface and the first strap.

6. The apparatus of claim 1, further comprising a friction interface between the mounting surface and the lower part of the main frame.

7. The apparatus of claim 1, further comprising a friction interface between the mounting surface and the main frame.

8. The apparatus of claim 5, further comprising a series of bolts for coupling the mounting surface to the first strap, whereby a force exerted by the bolts increases the frictional force between the friction interface and the first strap.

9. The apparatus of claim 1, wherein the friction interface comprises a friction compound in contact with the first strap.

10. The apparatus of claim 1, wherein the first strap conforms to the mounting surface.

11. The apparatus of claim 1, wherein the upper part comprises a second strap extending across the lower part.

12. The apparatus of claim 1, wherein the mounting surface comprises an outer surface of the stator.

13. The apparatus of claim 1, wherein the mounting surface comprises an outer surface of a generator housing within which the stator and rotor are disposed.

14. A method for assembling an apparatus for wind energy conversion, said method comprising:
mounting a first part of a nacelle main frame on a tower;
mounting a rotatably supported flange, which includes a first end, on the first part of the main frame;
providing a mounting surface at least partially enclosing a rotor space, wherein the mounting surface has a first and second side face, and wherein the first side face of the mounting surface exposes the rotor space;
providing spacers in the rotor space;
inserting a rotor into the rotor space such that the spacers are positioned between the rotor and the stator;
mounting the mounting surface, including the inserted rotor, on the first part of the main frame;
connecting the first end of the flange to the rotor;
removing the spacers such that the rotor is cantilevered into the rotor space from the first side face; and
connecting a first strap to the first part of the main frame, the first strap extending across the first part of the main frame and conforming to the mounting surface.

15. The method of claim 14, further comprising securing the first strap to the mounting surface.

16. The method of claim 15, wherein securing the first strap further comprises providing a friction interface between the mounting surface and the first strap.

17. The method of claim 15, wherein securing the first strap comprises fastening the first strap to a T-beam ring integrated into the mounting surface.

18. The apparatus of claim 1, wherein the stator comprises a superconductor.

19. The apparatus of claim 1, wherein the rotor comprises a superconductor.

20. The apparatus of claim 4, further comprising a friction interface between the integrated mounting plate and the first strap.

21. The apparatus of claim 4, wherein the friction compound comprises zinc.

22. The apparatus of claim 4, wherein the mounting plate comprises a T-beam ring integral with the mounting surface.

23. The apparatus of claim 1, further comprising a friction interface between the mounting surface and the first strap and a friction interface between the mounting surface and the lower part of the main frame.

24. The apparatus of claim 11, further comprising a friction interface in contact with the second strap.

25. The method of claim 15, wherein securing the first strap comprises fastening the first strap to a mounting plate integrated into the mounting surface.

* * * * *